(No Model.) 2 Sheets—Sheet 2.
J. BOOTH.
MACHINE FOR THE MANUFACTURE OF WINDOW FRAMES.
No. 457,698. Patented Aug. 11, 1891.
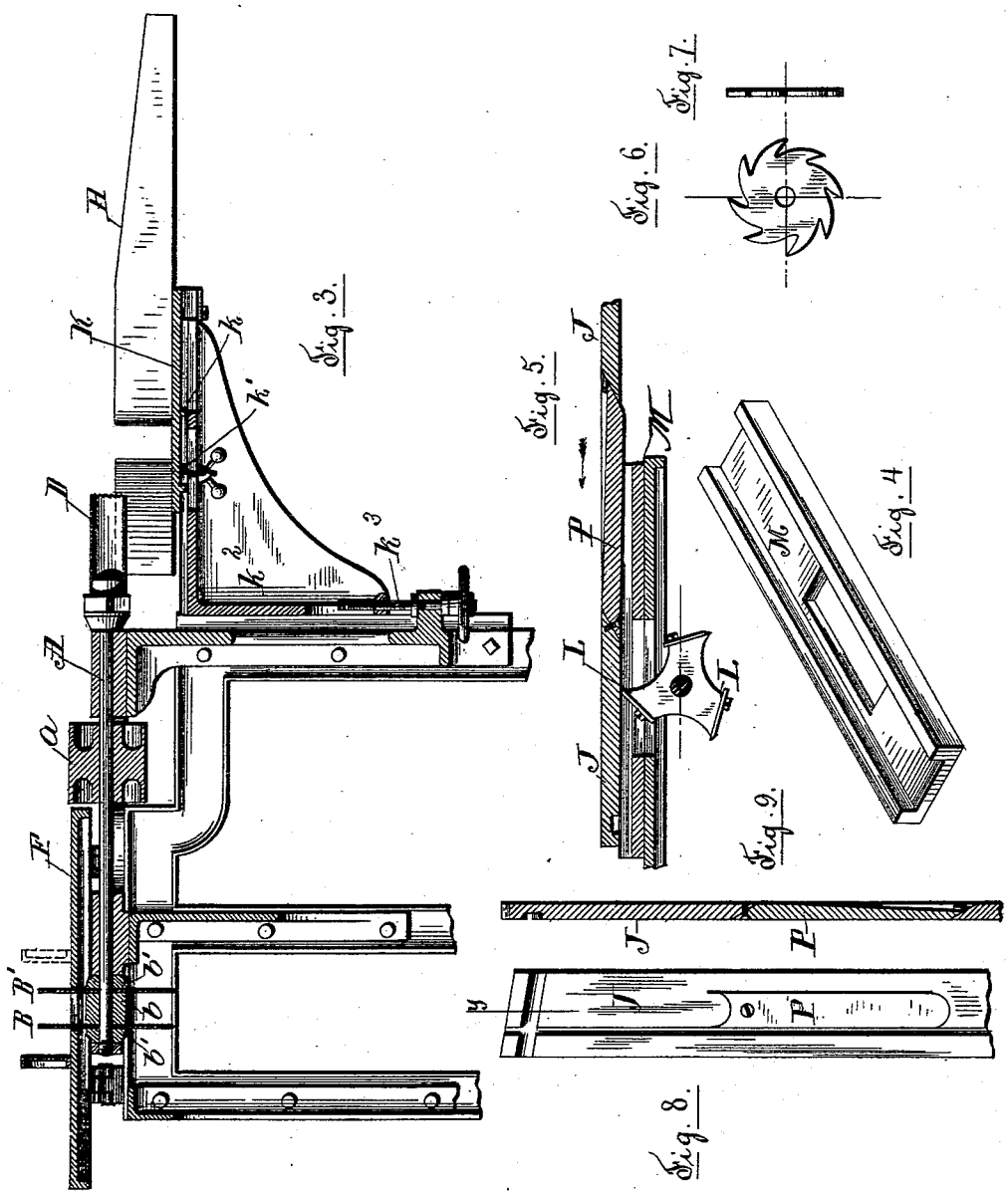

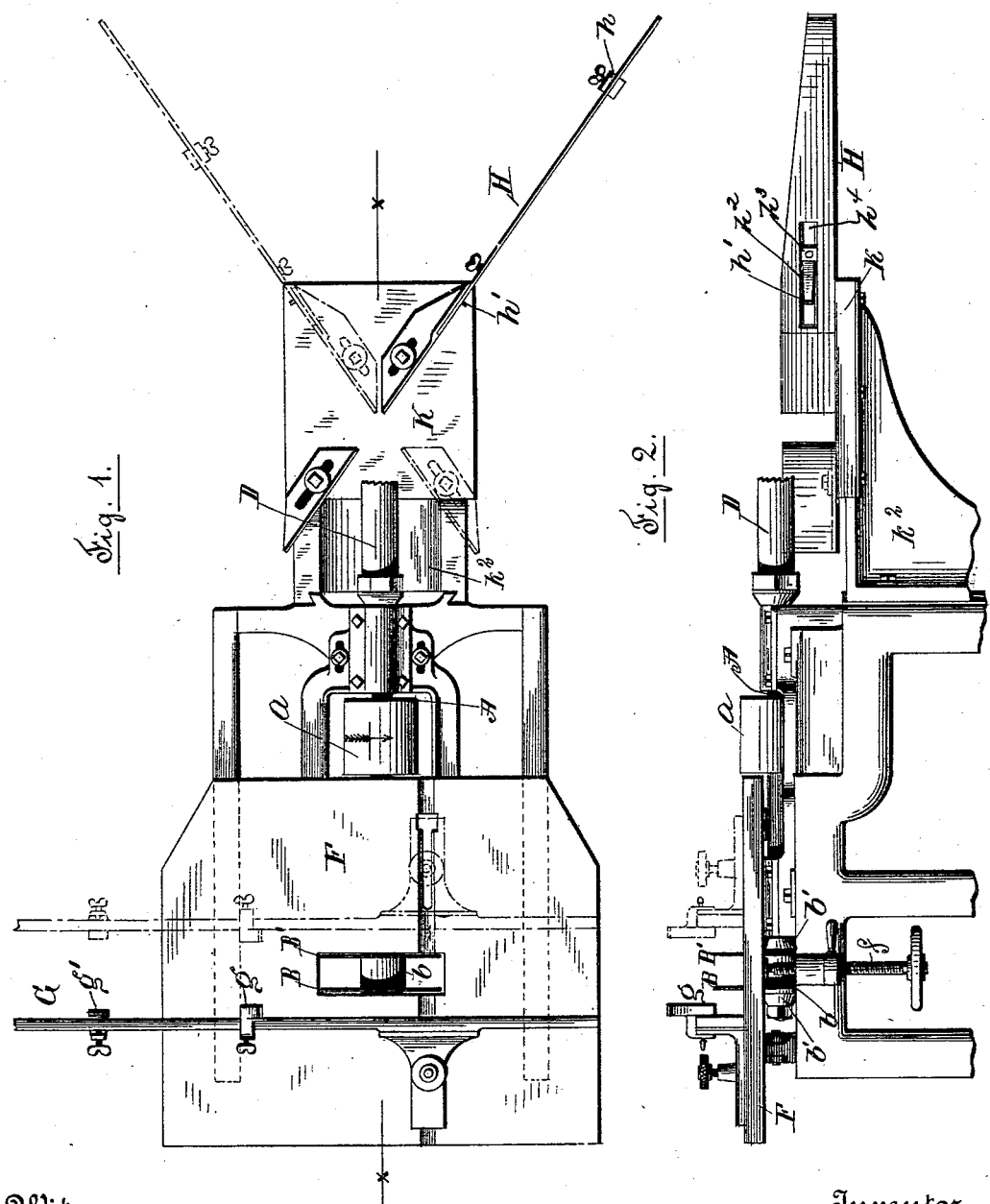

UNITED STATES PATENT OFFICE.

JAMES BOOTH, OF TAUNTON, MASSACHUSETTS.

MACHINE FOR THE MANUFACTURE OF WINDOW-FRAMES.

SPECIFICATION forming part of Letters Patent No. 457,698, dated August 11, 1891.

Application filed January 31, 1890. Serial No. 338,772. (No model.)

*To all whom it may concern:*

Be it known that I, JAMES BOOTH, of Taunton, in the county of Bristol and State of Massachusetts, have invented a new and useful Machine for the Manufacture of Window-Frames with the Pocket described in my Letters Patent No. 386,182, dated July 17, 1888, of which the following is a specification, reference being had to the accompanying drawings, in which—

Figure 1 is a plan. Fig. 2 is an elevation. Fig. 3 is a section on line $x$ $x$ of Fig. 1; and Figs. 4, 5, 6, 7, 8 and 9 are details explained hereinafter.

The window-frame pocket described in my patent above referred to is made by two parallel saw-kerfs which form the sides of the pocket-opening, and two other parallel curved saw-kerfs which form the ends of the opening, as shown in Figs. 8 and 9, one of which is a plan, the other a section on line $y$ $y$ of Fig. 8, of a jamb with my pocket-opening and its cover; and my present invention is a machine for doing the work represented in Figs. 8 and 9 rapidly and effectively.

In the drawings, A is the arbor, which carries upon it the two circular saws B B' and also the cylinder saw D. The arbor A is rotated by the pulley $a$, or in any other suitable way. The saws B B' project up through a bed or table F, and are clamped to the arbor by an intermediate collar $b$ and end collars $b'$. The intermediate collar $b$ determines the width of the pocket-cover P. The jamb J is presented with one end against the stop $g$ and with its edge against the edge gage G, the stop $g$ being so adjusted that when the jamb J is held with one edge against the edge gage G and the end of the jamb against stop $g$ it will be in proper relation with the saws B B'. The jamb at this time is somewhat slanted, one of its ends being held up by the workman, so that it is inclined to the saws and the saws cut gradually into it, but then is pressed down flat upon the bed F, causing the saws B B' to cut through it, and the jamb is then moved forward upon bed F and guided by edge gage G until its end strikes the stop $g'$, when the side cuts or kerfs are of the proper length and in the proper place in the jamb. As these jambs are rights and lefts, I have indicated in dotted lines a second edge gage and its stops on the right of the saws B B', which are used for making jambs which are rights, calling those like that shown in Fig. 8 "lefts." After the jambs J have the parallel side cuts made as above explained the end which is shown as the upper end in Fig. 8, but which is in fact the lower end of the jamb, is placed against the stop $h$ with its front side (which is the side shown in Fig. 8) against the supporting-gage H, mounted on carriage K. When the jamb J is thus held against the supporting-gage H, the second stop $h'$ (which is mounted upon a light plate spring $h^2$ and projects from supporting-gage H on its front side conveniently through an opening in gage H, as shown in Fig. 2) will be forced back out of the way by the pressure of the jamb upon it. The stop $h'$ is secured to a block $h^3$, sliding in slot $h^4$ in gage H, (see Fig. 2,) so that the stop $h'$ may be adjusted, if desired. The jamb being thus held against the support H, the carriage K is moved in on its ways until the stop $k$ on the carriage brings up against stop $k'$, which is adjustable on bracket $k^2$, which bracket carries the ways upon which carriage K moves, and when the carriage is moved forward the cylinder saw D has made the curved saw-kerf which forms the lower end of the pocket P, as shown in Fig. 8, (the upper end, in fact.) The carriage K is then drawn back and the jamb J moved forward, so that the end which is the upper end in Fig. 8 is adjusted by the stop $h'$, whereupon the carriage K is moved forward a second time and the second curved saw-kerf cut.

I have shown a second supporting-gage in dotted lines, in order that my machine may be adapted to both rights and lefts, as above explained.

I have described the circular saws B B' as working first and the cylinder saw D second; but this is a matter of choice.

When the pocket-covers P are put in place and connected and held as in Fig. 5, a portion projects, as illustrated in that figure, which must be planed off. To accomplish this, the saws B B' are removed from the arbor A and the planer-head L substituted. The auxiliary bed M (shown in Fig. 4) is then secured upon bed F, so that its slot is in proper relation to the planer-head L, and the jambs are passed over the planer-head, as shown in Fig. 5, thereby removing all the surplus portion of the pocket-covers, as will be clear without further description. This bed M is trough-shaped, so that the face of the jamb is firmly supported, while the projecting part of the pocket-cover is allowed to extend down into the path of the planer-head L.

Figs. 6 and 7 are edge and plan views of one of the circular saws.

I have shown the table F hinged at one end and adjustable by a set-screw $f$ at the other, and I have shown the table K as a slide-table mounted upon a bracket $k^2$, that bracket being adjustable by screw $k^3$; but, as will be clear, these are simply mechanical details, which may be largely varied. I have also shown the gages G and H as detachable; but that is mainly for the purpose of adjustment, and also in order that they may be removed in case the saws B B' D, or either of them, are to be used for some other purpose than making my patented pocket.

What I claim as my invention is—

1. In combination, table F, gage G, stop $g$, and saws B B', the stop $g$ projecting sidewise from gage G and mounted with its lower edge above the upper surface of table F to arrest the end of the stock until it is brought flat upon the table, and then to allow the stock to pass between it and the table, substantially as and for the purpose set forth.

2. In combination, carriage K, gage H, carried thereby, and stops $h\ h'$, projecting from the side of gage H, with cylinder saw D, stop $h'$ being mounted upon a spring, all substantially as and for the purpose set forth.

JAMES BOOTH.

Witnesses:
ELUHA T. JACKSON,
NELLIE B. LEONARD.